Oct. 29, 1968    P. CORBIN    3,408,088
AUTOMOBILE SUSPENSION
Filed Aug. 29, 1966    4 Sheets-Sheet 1
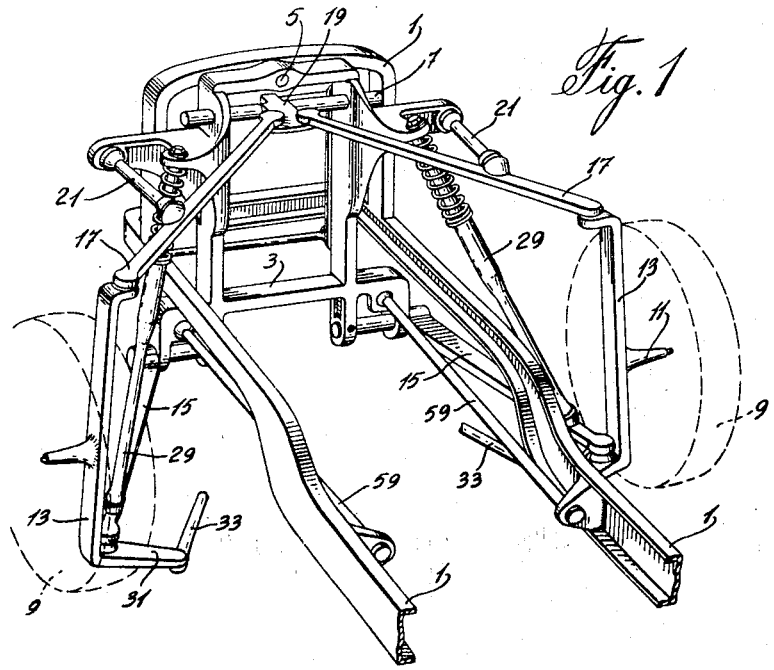
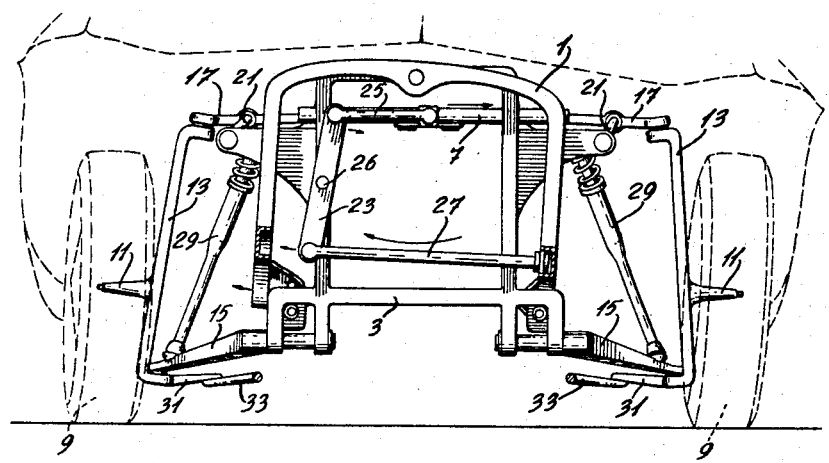
INVENTOR
Paul CORBIN
BY
Raymond A. Corbin
ATTORNEY Oct. 29, 1968 P. CORBIN 3,408,088
AUTOMOBILE SUSPENSION
Filed Aug. 29, 1966 4 Sheets-Sheet 2
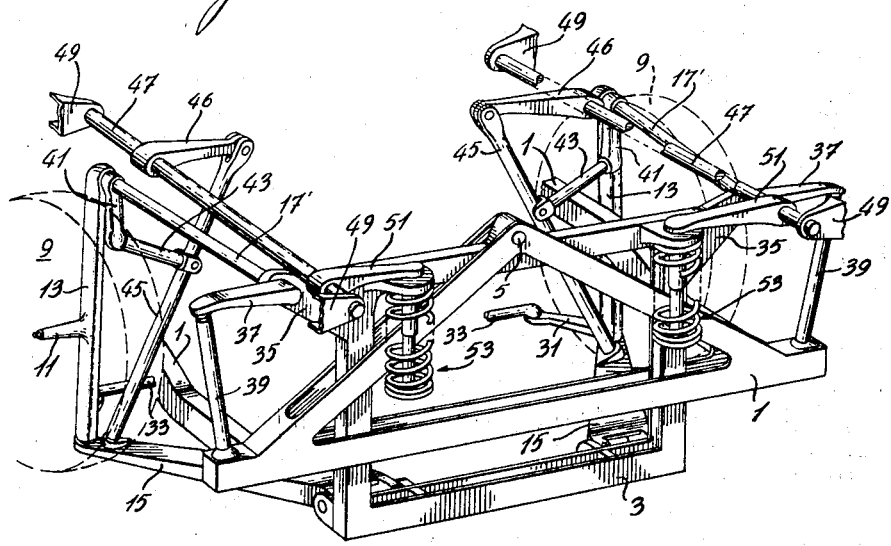
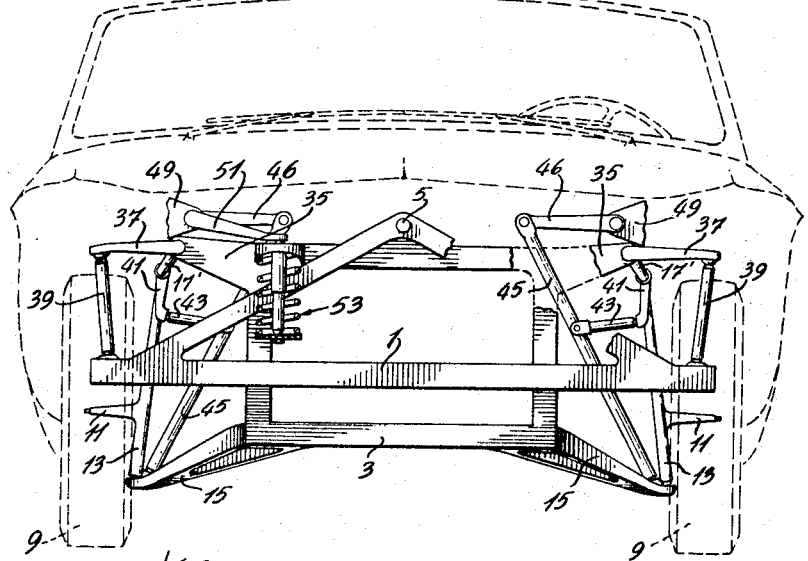
INVENTOR
Paul CORBIN
BY
ATTORNEY INVENTOR
Paul CORBIN
BY
ATTORNEY Oct. 29, 1968 P. CORBIN 3,408,088
AUTOMOBILE SUSPENSION
Filed Aug. 29, 1966 4 Sheets-Sheet 4

INVENTOR
Paul CORBIN
BY
ATTORNEY

United States Patent Office 3,408,088
Patented Oct. 29, 1968

3,408,088
AUTOMOBILE SUSPENSION
Paul Corbin, 7737 St. Denis St.,
Montreal 10, Quebec, Canada
Filed Aug. 29, 1966, Ser. No. 575,614
6 Claims. (Cl. 280—96.2)

ABSTRACT OF THE DISCLOSURE

An automobile suspension having a body frame pivotally mounted on the suspension frame above the center of gravity of the body for rocking of the body about a central longitudinal axis of the vehicle. A balancing rod is mounted for reciprocation on the suspension frame transversely thereof and the lower end of each knuckle bar is pivotally connected to the suspension frame through lower trailing arms. A pair of upper trailing arms are similarly articulated at one end to the upper end of the knuckle bars while the other ends are articulated to the center of the reciprocating rod. A pair of distance arms are articulated at one end to the suspension frame outwardly thereof in relation to the central articulation of the upper trailing arms while the other ends of the said distance arms are articulated to the upper trailing arms. A lever is pivotally mounted centrally thereof on the suspension frame below the pivot connection between the two frames, the upper and lower ends of the said levers being pivotally connected through links to the reciprocating bar and to the body frame, respectively.

The present invention generally relates to automobile suspensions and is an improvement of the suspension described and claimed in my prior U.S. Patent No. 3,261,621 of July 19, 1966 and 3,150,882 of Nov. 29, 1964.

The object of the present invention is generally the same as that of the U.S. patent which provides for the banking of the body and of the front wheels of an automobile in a curve an amount proportional to the speed of the automobile.

The improvement of the instant invention resides in a considerable simplification of the structure and also in an arrangement of the structural members that leaves more free room for the engine and engine parts. The structural members of the suspension of the invention generally lie laterally and forwardly of the vehicle, leaving the center space free for the mounting of the engine and parts.

Another improvement brought about by the instant invention in regard to the said U.S. patents is the actual suspension of the body which is from the top of the suspension frame and above the center of gravity rather than from the bottom thereof, thus substantially increasing the stability of the vehicle in a curve.

Furthermore, in one embodiment of the invention, the suspension is a three-point suspension of the body thus giving maximum efficiency to the wheel banking mechanism and reducing the torsion in the frame and body to thus reduce the cost thereof.

More specifically and in the first embodiment of the invention, banking of the knuckle bars and consequently of the front wheels is obtained by the deformation of a somewhat triangular structure, for each wheel, each such structure being formed of two trailing arms generally articulated to the top end of the corresponding knuckle bar with the end of one arm articulated to a transverse reciprocating rod mounted on the suspension frame and the free end of the other arm articulated to the suspension frame also but outwardly of the connection of the other arm. With such a structure, reciprocation of the transverse rod causes banking of the wheels. Leverage means is provided interconnecting the said reciprocating rod to the body frame to cause reciprocation of the said rod when the vehicle takes a curve and the body frame consequently swings outwardly in view of its pivotal connection to the suspension frame.

In this embodiment, the suspension proper is obtained by means of an elongated shock absorber unit on each side of the vehicle, the said unit having one end connected at the lower end of the knuckle bar while the upper end is connected at the top of the suspension frame.

The structural members of this very simple arrangement can easily be located laterally and forwardly of the vehicle so as to leave the maximum amount of free space for the mounting of the engine and of the engine parts.

In the second embodiment of the invention, the upper trailing arms are again articulated to the top of the knuckle bars but are pivotally mounted on one of the two frames. A special linkage interconnects the said upper trailing arms to the other frame whereby banking of the body frame relative to the suspension frame will cause rotation of the said upper trailing arms. The end of the said upper trailing arms adjacent the top of the knuckle bars is also connected, through a special linkage mechanism, to a relatively stationary suspension column and so constructed and arranged that upon rotation of the said upper trailing arm, the latter also rocks to cause inclination of the knuckle bars and wheels.

It is believed that a better understanding of the invention will be afforded by the description that follows having reference to the appended drawings, wherein:

FIG. 1 is a perspective view of the front wheel suspension of the invention, according to a first embodiment;

FIG. 2 is a front elevation view, looking rearward, of the suspension of FIG. 1;

FIG. 3 is a perspective view according to a second embodiment of the invention;

FIG. 4 is a front elevation view, partly broken away to show hidden structural members, of the embodiment of FIG. 3;

Figure 5:
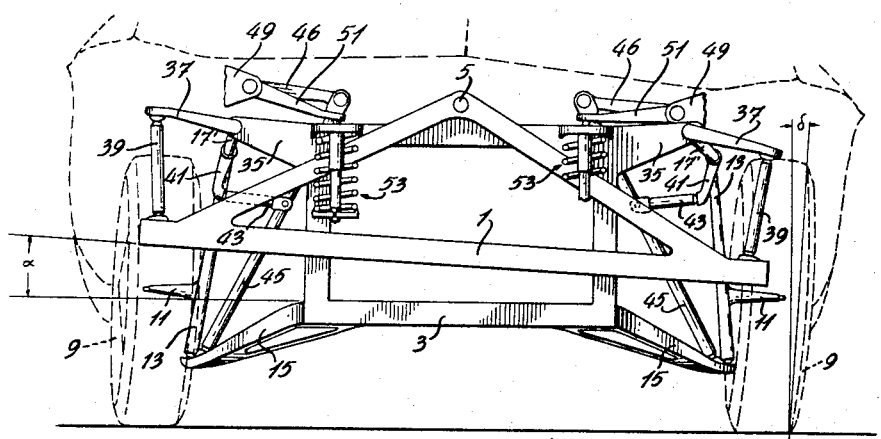
FIG. 5 is a view similar to that of FIG. 4 but showing the reaction of the suspension when the vehicle travels in a curve.

In the embodiment of FIGS. 1 and 2, the body frame 1 is pivoted to the suspension frame 3 by the pivot means 5 located generally in the central longitudinal plane of the vehicle and above the center of gravity thereof, in known manner. A reciprocating rod 7 is mounted to extend transversely through the suspension frame 3 slightly below the pivot means 5.

The wheels 9 of the vehicle are mounted, in known manner, on laterally projecting stub axles 11 located intermediate upstanding steering knuckle bars 13. To the lower ends of knuckle bars 13 are articulated a pair of lower trailing arms 15, the other ends of which are mounted on the suspension frame for pivotal movement about a transverse horizontal axis, as shown.

By "articulation" should be understood the type of connection between two members allowing limited universal movements therebetween.

A pair of upper trailing arms 17 are articulated, on the one hand, to the top of the steering knuckle bars 13 and, on the other hand, to the reciprocating rod 7, preferably centrally thereof. This may be achieved by having the said upper trailing arms 17 connected to a bracket 19 fast with the reciprocating rod 7.

Finally, a pair of distance arms 21 are articulated to the upper trailing arms 17 and to the upper portion of the suspension frame 3, respectively, as shown. It will be noted that the latter connections lie laterally of bracket 19 and that trailing arms 17, distance arms 21, and the members between bracket 19 and arms 21 generally define a deformable triangular structure.

Consequently, it will be understood that reciprocation of rod 7 will cause inclination of wheels 9 due to the spacing effect of the distance arms 21.

By the same token, it will be appreciated that the connections between the arms 17, 21 and the top of the steering knuckle bars 13 may be inverted so that the spacing arms 21 may well be articulated to the top of the knuckle bars 13 while the trailing arms 17 may be articulated to the distance rods 21.

Reciprocation of transverse rod 7 is obtained by means of a leverage balancing means illustrated in FIG. 2 and comprising a lever 23 pivotally mounted, centrally thereof at 26, on an upright member of suspension frame 3 below the pivot means 5 between the two frames and having, at the ends thereof, a pair of links 25, 27 pivotally connected thereto and in turn pivotally connected to the reciprocating bar 7 and to the body frame 1, respectively.

As also illustrated in FIG. 2, when the vehicle takes a curve, body 1 is swung leftward, outwardly of the curve, causing reciprocating rod 7 to shift rightward. As a consequence, wheels 9 are made to bank toward the inside of the curve.

The vehicle body is supported by means of a pair of elongated shock absorbing units 29 (springs and shock absorbers, for instance) having one end articulated to the lower end of the knuckle bars 13 and the upper end to the suspension frame 3 above the center of gravity of the vehicle. Again, it will be noted that the suspension is from the top of the suspension frame and the shock absorbing units are located generally laterally of the vehicle thus ensuring freedom in the center space of the suspension structure.

Steering of knuckle bars 13 is obtained in known manner by means of a mechanism comprising a pair of steering links 31 rigid with and projecting laterally from steering knuckle bars 13 and connecting rods 33, the latter being in turn connected to a steering mechanism, not shown.

In the embodiment shown in FIGS. 3, 4, 5, 6 and 7, the body frame is again numbered 1, the suspension frame 3, the pivot means between the two frames 5, the wheels 9, the steering knuckle bars 13 and the lower trailing arms 15.

The structure shown in these figures is symmetrical in relation to a vertical plane through the longitudinal axis of the vehicle so that reference will only be had to the leftward side of the structure.

An upper trailing arm 17' is articulated, at the ends thereof, to the upper end of knuckle bar 13 and to an ear 35 projecting laterally from the suspension frame 3. An actuating link 37 is fixedly secured at one end of the trailing arm 17' while an actuating rod 39 is articulated at the free end of actuating link 37 and at the lower and outward end of the body frame 1. Thus, it will be understood that swinging of the body frame relative to the suspension frame, as in a curve, will cause axial rotation of the upper trailing arm 17'.

Means is provided, at the other end of the upper trailing arm 17', to cause rocking thereof as it rotates, that is swinging inwardly or outwardly depending on the rotation of trailing arm 17' to thus cause inward or outward inclination of wheel 9, respectively.

In the preferred embodiment of the invention, this rocking means comprises a rigid arm 41 extending perpendicularly to and fixedly secured at one end of trailing arm 17' and a connecting link 43 articulated to one end of the rigid arm 41 and to a suspension column 45, the latter being articulated to the bottom of the steering knuckle bar 13. Suspension column 45 may generally be considered as stationary, as will hereinafter be explained.

Consequently, rotation of trailing arm 17' due to banking of frame 1 in relation to frame 3 will cause swinging or rocking thereof about its connection to the suspension frame 3. This is due to the elbow connection provided by arm 41 and link 43. Such a rotation of trailing arm 17' will consequently cause inclination or banking of the corresponding wheel 9.

The suspension proper is obtained by the aforementioned column 45 to the upper end of which is articulated a suspension link 46 having the free end thereof fast with a suspension rod 47 pivotally mounted on the body frame illustrated in FIG. 3 by the two brackets 49. Near the frontal bracket 49, the horizontal suspension rod 47 is provided with a lever 51, fast therewith and connected to a shock absorber unit 53 mounted on the suspension frame.

Now with reference to FIG. 5, when the vehicle body is shifted laterally leftward due to the vehicle taking a curve, the upper trailing arm 17', through link 37 and rod 39, is forced to rotate clockwise but, due to the linkage 41, 43, connecting it to the generally stationary column 45, the said rocking arm 17' swings rightward causing knuckle bar 13 and wheel 9 to bank also rightward and toward the center of the curve.

Figure 6:
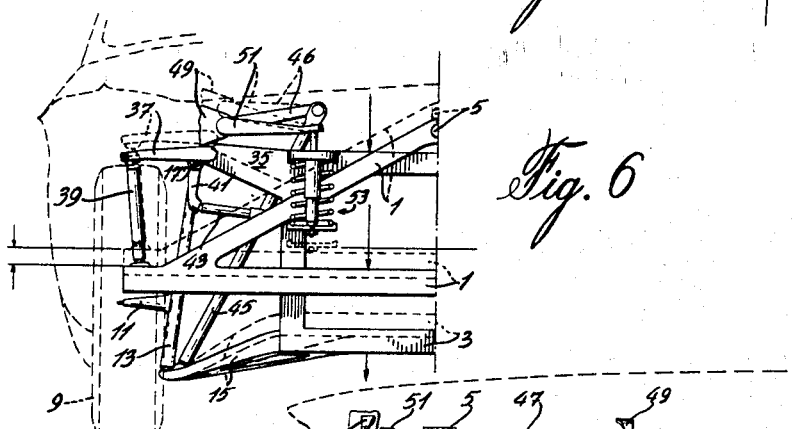
FIG. 6 is a half front elevation view similar to that of FIG. 4 and illustrating the reaction of the suspension when the vehicle hits an obstacle.
Figure 7:
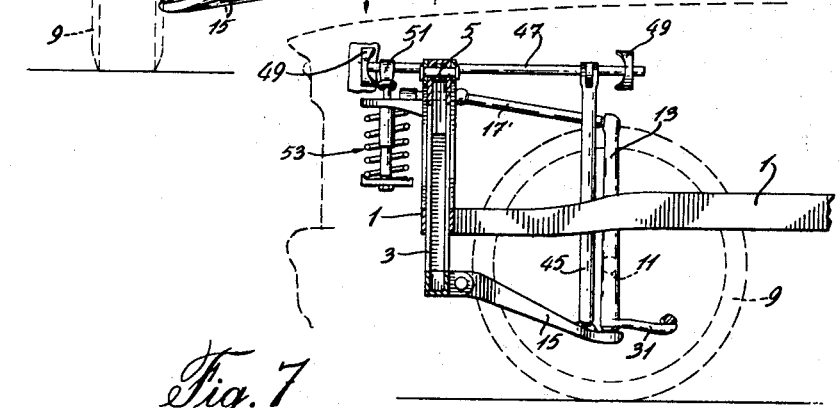
FIG. 7 is a longitudinal cross-sectional view of the embodiment fo FIG. 3.

With reference to FIG. 6, it will be appreciated that when the vehicle hits an obstacle, simultaneous lowering of frames 1 and 3 will cause counter-clockwise rotation of the suspension rod 47 again due to the stationary column 45 and the suspension link 46. This will in turn cause counter-clockwise rotation of lever 51 and compression of the spring of the shock absorber unit 53 for absorption and dampening of the jolt.

Figure 10:
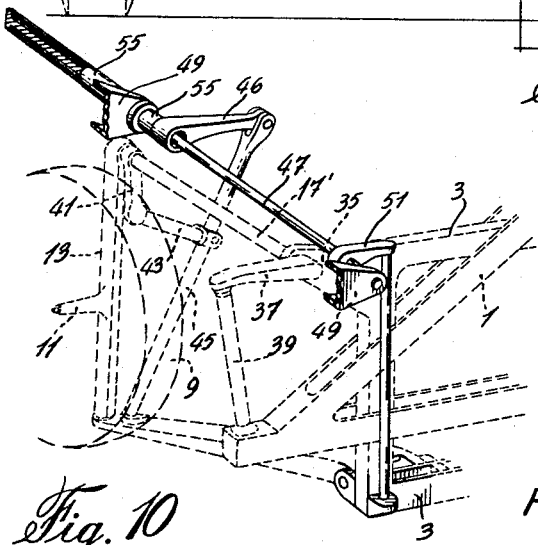
FIG. 10 is a perspective view of an alternative of shock absorbing means for the embodiment of FIG. 3.

With reference to FIG. 10, an alternative to the shock absorber unit 53 is illustrated. In this instance, the suspension rod is again pivotally connected to a forward bracket 49 but the other end extends into a torsion tube 55 and is connected to the latter at the extreme end thereof. The said torsion tube freely extends through a rearward bracket 49 as a bearing therefor and the suspension link 46 is connected directly onto this torsion tube 55 rather than to suspension rod 47. This causes increased torsional effect of rod 47.

In this instance, lever 51 may be connected to an upstanding rod 57 connected at the bottom to the suspension frame 3, the said rod 57 being threaded to lever 51. It will be understood that this arrangement will serve to adjust the height of the vehicle.

The embodiments of FIGS. 1 and 3 are of course provided with the usual radius rods such as 59 of FIG. 1 and other conventional structural members for lateral and longitudinal stabilization.

Figure 8:
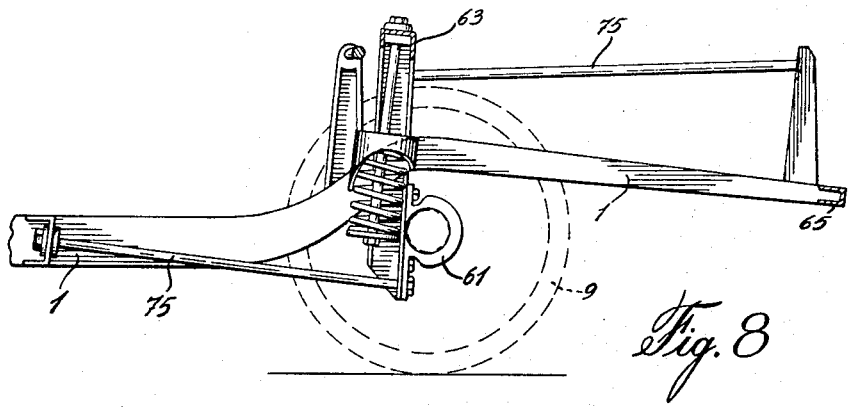
FIG. 8 is a longitudinal cross-sectional view of the rear suspension applicable to both embodiments of FIGS. 1 and 3.
Figure 9:
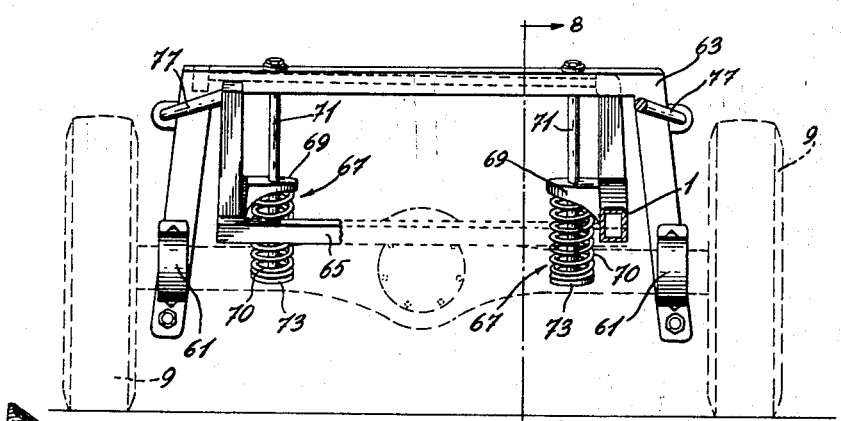
FIG. 9 is a transverse cross-sectional view of the rear suspension of FIG. 8.

A two-point rear suspension according to the invention is illustrated in FIGS. 8 and 9.

It will be seen that the body frame 1 rises above the rear axle 61 and extends rearwardly therefrom. The suspension comprises a U-shaped bridging member 63 having the ends of the lateral legs thereof secured on the rear axle 61 of the car, longitudinally thereof and over the body frame 1. The latter is shown as lateral members interconnected by a transverse rear member 65.

The two-point suspension above the center of gravity comprises a pair of shock absorber units 67 having caps 69 secured to the lateral members of frame 1, springs 70, spring rods 71 fixed to the bridging structure 63 at one end and to spring bearing plates 73 at the other end. Springs 70 are held between the bearing plates 73 and the caps 69.

Lateral and longitudinal stabilizing members are provided in the form of radius rods 75 and 77.

Consequently, the load through the body frame 1 is applied on the two laterally disposed springs 70 and transferred onto the rear axle 61 through the bridging structure 63.

Although specific embodiments of this invention have just been described, it will be understood that various modifications are permissible within the spirit of the invention, the scope of which is to be determined from the appended claims only.

I claim:

1. In a motor vehicle having a front wheel suspension frame and a body frame pivotally mounted on said suspension frame above the center of gravity of the vehicle body for rocking of said body about a central longitudinal axis thereof, a pair of steering knuckle bars each on one side of said front wheel suspension frame with a wheel mounted on each knuckle bar intermediate the ends thereof for steering movement, a balancing rod mounted for reciprocation on said suspension frame transversely thereof, a pair of trailing rods each articulated to the lower end of one knuckle bar and pivoted to the suspension frame; the new combination comprising:
    (a) a pair of upper trailing arms articulated at one end to said balancing rod;
    (b) a pair of distance arms articulated at one end to said suspension frame outwardly thereof in relation to the articulation of said upper trailing arms to said balancing rod;
    (c) the free ends of the arms of one pair each being articulated to the arms of the other pair and the said arms of the other pair each being articulated to the upper end of one of said knuckle bars, and
    (d) leverage balancing means connecting said body frame, below the pivot connection of the body frame to the suspension frame, to said balancing rod for reciprocation thereof, constructed and arranged so that upon banking of said vehicle in a curve and swinging of said body frame away from the center of the curve, said upper trailing and distance arms force said knuckle bars to bank toward the center of the curve.

2. The new combination of claim 1, further comprising a pair of shock absorber units, each unit connected at one end to one of said knuckle bars adjacent the lower end thereof and connected at the other end to the upper end of said suspension frame on one side of the pivot connection between said frames.

3. The new combination of claim 1, wherein the free ends of said distance arms are articulated to the upper trailing arms while the free ends of said upper trailing arms are articulated to the upper ends of the knuckle bars.

4. The new combination of claim 2, wherein the free ends of said distance arms are articulated to the upper trailing arms while the free ends of said upper trailing arms are articulated to the upper ends of the knuckle bars.

5. The new combination of claim 2, including a rear-wheel suspension comprising:
    a U-shaped bridging frame secured to the rear axle of said vehicle, longitudinally thereon, and over said body frame;
    shock-absorbing units interconnecting said body frame and bridging frame, and
    stabilizing means interconnecting said body frame and said rear axle, and said body frame and bridging frame.

6. The new combination of claim 1 wherein said lever balancing means comprises a lever pivotally mounted, centrally thereof, on said suspension frame below the pivot connection between said body and suspension frames; a pair of links respectively pivotally connected at the ends thereof to the upper and lower ends of said lever and to said balancing rod and body frame.

References Cited

UNITED STATES PATENTS

| 3,150,882 | 9/1964 | Corbin | 280—112 |
| 3,261,621 | 7/1966 | Corbin | 280—96.2 |

BENJAMIN HERSH, *Primary Examiner.*

RICHARD J. JOHNSON, *Examiner.*

L. D. MORRIS, JR., *Assistant Examiner.*